(12) United States Patent
Eigel et al.

(10) Patent No.: US 11,373,534 B2
(45) Date of Patent: Jun. 28, 2022

(54) METHOD FOR PROVIDING MAP DATA IN A TRANSPORTATION VEHICLE, TRANSPORTATION VEHICLE AND CENTRAL DATA PROCESSING DEVICE

(71) Applicant: VOLKSWAGEN AKTIENGESELLSCHAFT, Wolfsburg (DE)

(72) Inventors: Thomas Eigel, Berlin (DE); Sebastian Busch, Braunschweig (DE)

(73) Assignee: Volkswagen Aktiengesellschaft

( * ) Notice: Subject to any disclaimer, the term of this patent is extended or adjusted under 35 U.S.C. 154(b) by 266 days.

(21) Appl. No.: 16/702,717

(22) Filed: Dec. 4, 2019

(65) Prior Publication Data

US 2020/0184823 A1 Jun. 11, 2020

(30) Foreign Application Priority Data

Dec. 5, 2018 (DE) ...................... 10 2018 221 054.3

(51) Int. Cl.
| | |
|---|---|
| *G08G 1/16* | (2006.01) |
| *G01C 21/34* | (2006.01) |
| *G06Q 50/30* | (2012.01) |
| *G06V 20/58* | (2022.01) |
| *G06V 40/10* | (2022.01) |

(52) U.S. Cl.
CPC .......... *G08G 1/166* (2013.01); *G01C 21/343* (2013.01); *G06Q 50/30* (2013.01); *G06V 20/58* (2022.01); *G06V 40/103* (2022.01); *G08G 1/163* (2013.01)

(58) Field of Classification Search
CPC ...... G08G 1/166; G08G 1/163; G08G 1/0112; G08G 1/096791; G08G 1/096708; G08G 1/0969; G01C 21/343; G01C 21/32; G01C 21/3602; G06K 9/00369; G06K 9/00805; G06Q 50/30; G06V 20/58; G06V 40/103
See application file for complete search history.

(56) References Cited

U.S. PATENT DOCUMENTS

| | | |
|---|---|---|
| 6,526,352 B1 | 2/2003 | Breed et al. |
| 9,248,834 B1 | 2/2016 | Ferguson et al. |
| 2005/0134440 A1 | 6/2005 | Breed |
| 2009/0028384 A1 | 1/2009 | Bovyrin et al. |
| 2010/0104199 A1 | 4/2010 | Zhang et al. |
| 2015/0332114 A1 | 11/2015 | Springer |
| 2016/0046290 A1 | 2/2016 | Aharony et al. |

(Continued)

FOREIGN PATENT DOCUMENTS

| | | |
|---|---|---|
| DE | 102006040537 A1 | 3/2008 |
| DE | 102016203723 A1 | 9/2017 |

(Continued)

*Primary Examiner* — Michael V Kerrigan
(74) *Attorney, Agent, or Firm* — Barnes & Thornburg, LLP

(57) ABSTRACT

A method for providing map data in a first transportation vehicle wherein position data is detected by second transportation vehicles concerning people detected by the second transportation vehicles in a surrounding area of the respective second transportation vehicles and is transmitted to a central data-processing unit so that at least one route which is at least partly used by at least some of the people is specified by the central data processing unit based on the aggregated position data and that route data of the specified at least one route is provided as part of the map data in the first transportation vehicle.

15 Claims, 1 Drawing Sheet

(56) References Cited

U.S. PATENT DOCUMENTS

| | | | |
|---|---|---|---|
| 2016/0300485 A1 | 10/2016 | Ayvaci et al. | |
| 2017/0124476 A1 | 5/2017 | Levinson et al. | |
| 2017/0261325 A1 | 9/2017 | Schroeder et al. | |
| 2017/0323448 A1 | 11/2017 | Whiting et al. | |
| 2018/0075747 A1* | 3/2018 | Pahwa | B60W 30/0956 |
| 2018/0105107 A1 | 4/2018 | Hassan-Shafique et al. | |
| 2018/0326982 A1* | 11/2018 | Paris | G08G 1/166 |

FOREIGN PATENT DOCUMENTS

| | | |
|---|---|---|
| JP | 2009083815 A | 4/2009 |
| WO | 2012047977 A2 | 4/2012 |
| WO | 2012089612 A1 | 7/2012 |
| WO | 2017118907 A1 | 7/2017 |
| WO | 2018008314 A1 | 1/2018 |

\* cited by examiner

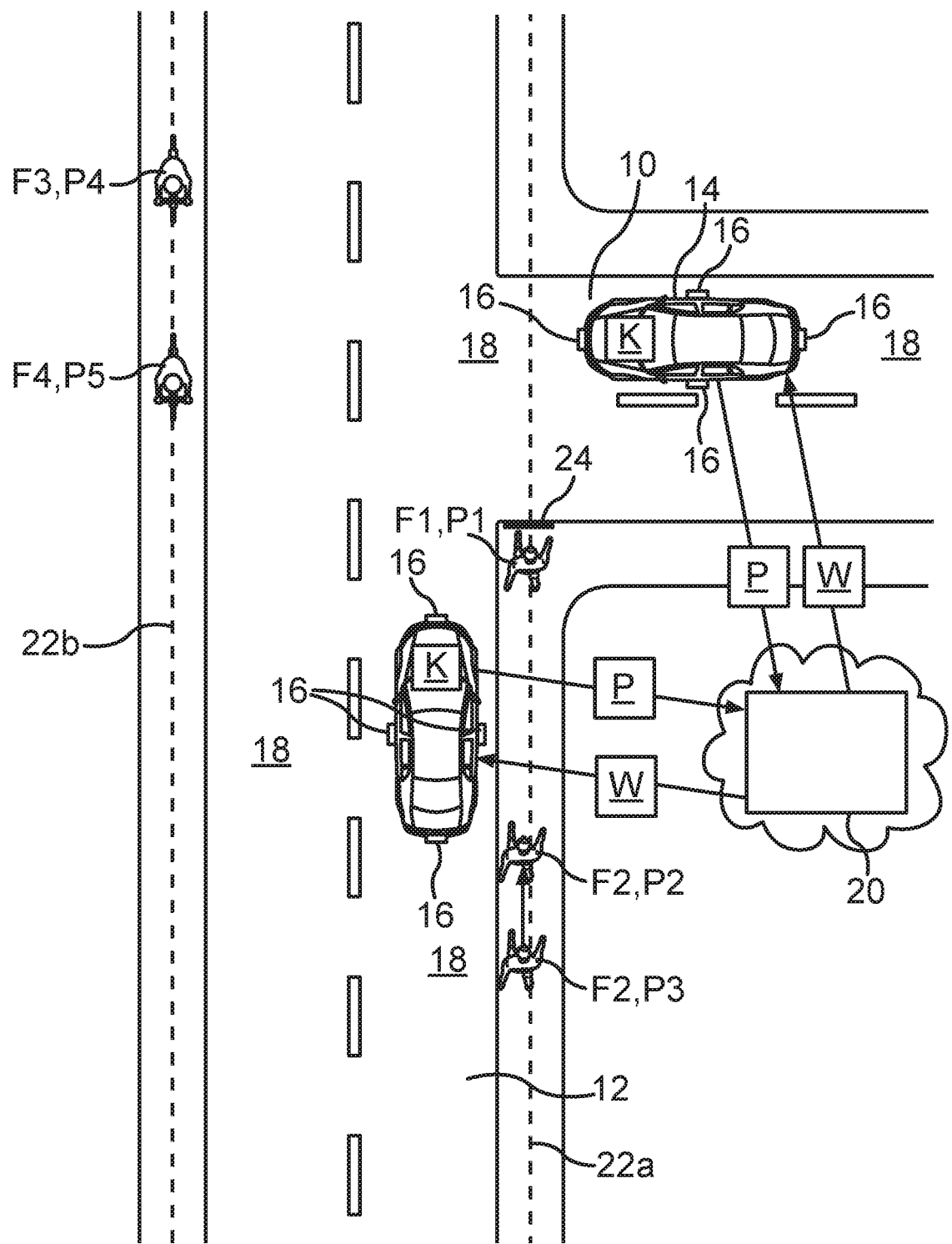

METHOD FOR PROVIDING MAP DATA IN A TRANSPORTATION VEHICLE, TRANSPORTATION VEHICLE AND CENTRAL DATA PROCESSING DEVICE

PRIORITY CLAIM

This patent application claims priority to German Patent Application No. 10 2018 221 054.3, filed 5 Dec. 2018, the disclosure of which is incorporated herein by reference in its entirety.

SUMMARY

Illustrative embodiments relate to a method for providing map data in a transportation vehicle. Illustrative embodiments also relate to a transportation vehicle and a central data-processing unit.

BRIEF DESCRIPTION OF THE DRAWINGS

Disclosed embodiments are described in more detail below with reference to the drawing, in which:

FIG. 1 shows a schematic representation of a traffic situation on a merging road which leads onto a main road to demonstrate a method for providing map data in a transportation vehicle in an exemplary embodiment.

DETAILED DESCRIPTION

Digital maps known from the prior art typically comprise structural transport routes, such as roads or cycle paths, for example. Within the context of the increasing automation of transportation vehicles, the accuracy and reliability of map data of this type is also becoming increasingly important. Nevertheless, reliable and accurate map data are also relevant for drivers of non-autonomous driving transportation vehicles. It would therefore be desirable to be able to provide the most reliable and accurate map data in a transportation vehicle.

US 2017/0124476 A1 focuses on the identification and classification of surrounding objects, in particular, other road users such as pedestrians, for example. Moreover, due to the link between sensor data, for example, pedestrian identification, and information regarding the surrounding area, for example, a nearby concert hall, a future movement of such pedestrians can be inferred. An optimal trajectory for the individual transportation vehicle may then be specified. It is true that knowledge of the likely movement of pedestrians is likewise beneficial with respect to road safety, however it cannot achieve a more reliable or more accurate provision of map data in transportation vehicles.

Disclosed embodiments provide a method for providing map data in a transportation vehicle, a transportation vehicle and a central data-processing unit by which road safety can be increased.

Disclosed embodiments provide a method, a transportation vehicle and a central data-processing unit.

In a disclosed method for providing map data in a first transportation vehicle, position data detected by a plurality of second transportation vehicles concerning people detected by the second transportation vehicles in a surrounding area of the respective second transportation vehicles are transmitted to a central data-processing unit. By the central data-processing unit, depending on the aggregated position data, at least one route is specified which was at least partly used by at least some of the people, and route data of the specified at least one route are provided as part of the map data in the first transportation vehicle.

The disclosure is based on the recognition that knowledge of routes which are typically used by people, for example, pedestrians, is especially safety-related. However, precisely with regard to such pedestrian paths or even cycle paths, it often occurs that such routes which are typically used by people vary significantly from the actually structurally provided routes which are recorded in maps, such as designated pedestrian paths, for example. However, clusters of data collected which include information regarding actual positions of such people are well suited to determining the routes actually used by people in an accurate and reliable manner. These can then be provided as part of map data in a transportation vehicle, in this case the first transportation vehicle. Usually, the first transportation vehicle can also represent one of the second transportation vehicles or can be different from the second transportation vehicles.

Clusters of data are intended to be understood to mean data which are provided by a cluster of transportation vehicles, i.e., a plurality of different transportation vehicles which in the present case are described as second transportation vehicles. Clusters of data of this type comprise the detected position data of the respective people who are located in the surrounding area of the relevant second transportation vehicles. In other words, a second transportation vehicle of this type can repeatedly monitor if there is a person in its surrounding area or if a person can be detected. If this is the case, position information related to this person can be specified and can be transmitted to the central data-processing unit. This central data-processing unit collects the position information transmitted from the respective second transportation vehicles from various locations and from various people. Aggregating these collected position data thus makes it possible to specify, in particular, through statistical analysis of these data, which routes are typically used by the people and to where these routes typically proceed. Since this information was obtained on the basis of actual positions of actually detected people, the routes determined in this way also correspond to routes actually used by people. In other words, real routes, i.e., pedestrian and/or cycle paths, for example, can thus be specified in an accurate and reliable manner.

As mentioned above, the people may represent pedestrians and/or cyclists. Both pedestrians and cyclists often use routes which are not explicitly identified as pedestrian paths or considered to be official cycle paths, for example, to take certain shortcuts, or the like. Actual pedestrian and cycle paths of this type can now be specified by the disclosed embodiments and the configurations thereof and can be provided as map data in a transportation vehicle, regardless of whether they also represent official transport routes. Road safety can thus be significantly increased through the knowledge obtained in this way in a transportation vehicle regarding real transport routes used by pedestrians and/or cyclists.

The detected people are usually intended to be understood to mean any kind of road users who are not using a transportation vehicle. This means that cyclists are also understood to mean users of power-assisted bicycles, in particular, E-bikes. Further examples of such people would also be scooter users, skateboarders, in-line skaters, or the like.

In a further disclosed embodiment, the second transportation vehicles detect people in the respective surrounding area by at least one environment sensor. Due to the increasing automation of certain driving functions and transportation vehicles in general, today's transportation vehicles already have a plurality of environment sensors, such as environment cameras, ultrasonic sensors, radar sensors and/or laser scanners, for example. These can now also be used for detecting people in the surrounding area of the relevant transportation vehicles. Due to the high availability of such a transportation vehicle-specific sensor system in conjunction with an online connection, which is usually also present in transportation vehicles, the position data of the people can thus be transmitted to the central data-processing unit in a simple manner, and thus the environmental data detected can be aggregated to form an accurate environmental map, in particular, with regard to the detected people. The typical pedestrian and cycle paths described previously then result from the aggregation. The communication link between the respective second transportation vehicles, as well as between the first transportation vehicle and the central data-processing unit, can generally be based on any appropriate communication standard, optionally, a radio standard.

Furthermore, it is beneficial if the second transportation vehicles repeatedly detect the position data of the people for as long as the respective people are located in a specific detection area of the respective second transportation vehicles, in particular, the environment sensors associated therewith. Therefore, if the position of a specific person alters over time, for example, this can also be detected. In this way, not only can the momentary positions of people be detected and used, but also position progression data, or rather movement data of the relevant people, for example. This is beneficial, for example, to be able to determine so-called stop points along the routes, as is explained later in greater detail.

To detect at least one of the people through at least one of the second transportation vehicles, an object in the surrounding area of the second transportation vehicle may be initially detected by the second transportation vehicle, and the detected object is classified by the second transportation vehicle as a person or at least as being related to a person, such as a cyclist, for example. To classify objects in a surrounding area of a transportation vehicle, in particular, with regard to their type, a plurality of methods is known from the prior art, such that they will not be discussed in greater detail. Optionally, the position data of these objects are thus only transmitted to the central data-processing unit if the detected objects were also actually classified as being related to a person, for example, as a pedestrian and/or cyclist. The background of this is that other motorized road users do not typically deviate from the structurally predetermined transport routes. However, as described above, this is different especially when in relation to pedestrians and/or cyclists, such that here, in particular, determining the actual transport routes is of interest, whereas it would be unnecessary with regard to other motorized road users, since the actual transport routes determined in this way would then usually be consistent with the structurally predetermined transport routes.

Moreover, in accordance with a further disclosed embodiment, it is envisaged that, to provide the position data concerning at least one of the detected people through at least one of the second transportation vehicles, a first position of the detected person relative to the second transportation vehicle is specified, and a second position of the second transportation vehicle is specified, and the position data are determined depending on the first position and the second position. In other words, the position of the detected person relative to the transportation vehicle can initially be determined by the transportation vehicle, for example, with respect to a fixed transportation vehicle coordinate system. Additionally, the transportation vehicle can also determine its own position, for example, by a GPS receiver or another position-determining unit of the transportation vehicle, in particular, as a global position, for example, as geocoordinates or GPS coordinates. Through knowledge of these two positions, namely the position of the person relative to the transportation vehicle and also the absolute or rather global position of the transportation vehicle, the position of the person can thus also be determined as a global position. This global position can then likewise be indicated as GPS coordinates and be transmitted to the central data-processing unit, for example. However, the detected relative position of the person and the individual position of the second transportation vehicle, i.e., both the first and the second position, can also be transmitted to the central data-processing unit, which in turn determines the global position of the person therefrom and collects it together with the other position data which are provided by the other second transportation vehicles. The position data concerning the people can thus be determined in a simple manner.

In a further disclosed embodiment, depending on the aggregated position data, it shall be reviewed whether at least one stop point is located on the specified route, and if this is the case then a position of the stop point shall be provided to the first transportation vehicle as part of the route data. Exact stop points of pedestrians and/or cyclists are relevant since they typically represent such areas in which people's routes cross paths with other transport routes, such as roads, for example. For example, such stop points are typically located at the start of a zebra crossing or at a pedestrian light at the beginning of a pedestrian crossing which runs across the road, or at the end of a pedestrian path which is interrupted by a crossroad, etc. Many people typically therefore gather at such stop points, in particular, pedestrians and/or cyclists, so that such stop points carry a high safety risk and a great deal of caution should be exercised accordingly in such areas. Knowledge of such stop points is therefore beneficial since they can be taken into account by diverse driver assistance systems of the transportation vehicle or by the driver themselves, which in turn can increase safety. It is further beneficial if, depending on the detected position data, movement data of the people are determined and the at least one stop point is specified depending on the movement data. Since such stop points typically represent points, areas or lines at which people such as pedestrians and/or cyclists stop, such stop points can be identified in a simple manner based on the clusters of data by searching for areas in which the speed of the detected people is typically 0 or at least very low, for example, under a predefined threshold value. This can now be determined based on the provided movement data which, as described previously, can be provided in a simple manner.

In a further disclosed embodiment, at least one driver assistance function of the first transportation vehicle is carried out depending on the route data provided. The driver assistance system of the transportation vehicle, which carries out the driver assistance function, can generally be, on the one hand, a driver assistance system which only supports the driver when driving the transportation vehicle, or, on the other hand, it can also be a driver assistance system which is designed to drive the first transportation vehicle autonomously. In both cases, it is beneficial if such a driver assistance function is carried out depending on the route data provided. Knowledge of real routes which are used by people such as pedestrians and/or cyclists is relevant, especially if they deviate from the structurally predetermined transport routes, both for drivers who manually drive their transportation vehicle and for autonomously driving transportation vehicles. For example, a driver can be made aware of such determined, actual transport routes in good time, can be warned about corresponding stop points, and even emergency braking systems can use the provided map data to avoid failed interventions or to check the plausibility of interventions, for example. Even if the transportation vehicle is being steered autonomously by a driver assistance system, it can, for example, drive more slowly in the area of detected stop points or of typical crossing points between the people's actual routes and the first transportation vehicle's current, individual, planned route. A plurality of possibilities is therefore available to increase the road safety based on the route data provided.

Moreover, the disclosed embodiments also relate to a transportation vehicle which is designed to detect people in the surrounding area of the transportation vehicle and to specify position data of the people. Furthermore, the transportation vehicle is designed to transmit the specified position data to a central data-processing unit and to receive, from the central data-processing unit, route data of at least one route, which is specified on the basis of aggregated position data of the transportation vehicle and/or of second transportation vehicles and which was at least partly used by people, as part of map data, and to carry out an assistance function depending on the received route data, for example.

Moreover, the disclosed embodiments also relate to a central data-processing unit for providing map data in a first transportation vehicle. The central data-processing unit can be formed as a backend server or cloud server, for example. Furthermore, the central data-processing unit is designed to receive position data detected by a plurality of second transportation vehicles concerning people detected by the second transportation vehicles in a surrounding area of the respective second transportation vehicles, to aggregate the received position data and, depending on the aggregated position data, to specify at least one route which was at least partly used by at least some of the people. Furthermore, the central data-processing unit is designed to provide route data of the specified at least one route as part of the map data in the first transportation vehicle, for example, to transmit the data to this first transportation vehicle.

The benefits mentioned for the disclosed method and the embodiments thereof shall equally apply to the disclosed transportation vehicle and the disclosed central data-processing unit. Moreover, the method operations described in relation to the disclosed method and the embodiments thereof make it possible to develop the disclosed transportation vehicle and the disclosed central data-processing unit by way of further corresponding representational features.

A system with a central data-processing unit and at least one transportation vehicle, the system being designed to carry out a disclosed method or one of the embodiments thereof, shall also be considered as being included in the disclosure.

The disclosure also comprises the combinations of the features of the embodiments described.

An exemplary embodiment is described hereinafter. In the exemplary embodiment, the described components of the embodiment each represent individual features which are to be considered independently of one another and which also each develop independently of one another, and thus they should also be considered as a component of the disclosure, individually or in a combination which is different from the one shown. Furthermore, the described embodiment can also be supplemented by further features of the disclosure already described.

For this purpose, the single FIGURE shows a schematic representation of a traffic situation on a merging road 10 which leads onto a main road 12, for example, to demonstrate a method for providing map data in a transportation vehicle in accordance with an exemplary embodiment. In this case, two transportation vehicles 14 are represented in an exemplary manner, which each also comprise environment sensors 16 to detect an environment or the surrounding area 18 of the respective transportation vehicles 14. This environment sensor system 16 can now also be used to detect people located in the surrounding area 18 of the transportation vehicles 14, as well as their positions. Such people can represent pedestrians and/or cyclists or other non-motorized road users, for example.

Here, as an example, a first pedestrian F1 is shown in a first position P1, a second pedestrian F2 in a current second position P2, and this second pedestrian F2 is shown in a temporally preceding third position P3, a cyclist F3 in an associated fourth position P4 and a further cyclist F4 in an associated fifth position P5. As the second pedestrian F2 is intended to demonstrate, it is not only the current position of the people F1 to F4 that can be detected, in particular, on a one-off basis, but these people F1 to F4 can be repeatedly detected, including their respective positions P1 to P5 at associated times, for as long as these people F1 to F4 are located in detection areas of the associated environment sensor system 16 of the respective transportation vehicles 14. Respective position progression data can thus also be provided for the respective people F1 to F4, for example. These position data P of the respective detected people F1 to F4, which position data are detected by the respective transportation vehicles 14, are subsequently transmitted to a central data-processing unit 20, such as a cloud server, for example. This central data-processing unit 20 aggregates these position data P and statistically evaluates them. Based on the statistical evaluation of these aggregated position data P, routes 22a, 22b which were at least partly used by the detected people F1 to F4 can thus be determined. If the position data P provided by a plurality of transportation vehicles 14 are collected and aggregated over longer periods of time, the actual transport routes used by pedestrians and/or people can be specified in an accurate and reliable manner. These can possibly also deviate from the structurally predetermined transport routes.

The route data W concerning the routes 22a, 22b determined in this way can then in turn be provided to the transportation vehicles 14, in particular, also to other further transportation vehicles, as a part of map data K. In addition to the transport routes recorded in the maps K, in particular, also those which are defined by structural specifications, the real pedestrian and cycle paths can then additionally also be take into account in such a map K. Movement data of the respective people F1 to F4 can also be provided, as described, on the basis of the position data P. Moreover, this makes it possible, in addition to the routes 22a, 22b used by the people F1 to F4, to also determine stop points 24 on these respective routes 22a, 22b, if applicable, at which the people F1 to F4 often or usually pause or stop. Such stop points 24 are typically located at the beginning of a crossing of the relevant route 22a, 22b, which is used by the people F1 to F4, and other transport routes. In this example, the stop point 24 is located at the beginning of the crossing of the pedestrian path 22a and the merging road 10. Particular caution should therefore be exercised especially at such stop points 24. These stop points 24 can also be provided as part of the route data W to the relevant transportation vehicles 14 as part of the map data K, and these can then also be used by the respective transportation vehicles 14 or by corresponding driver assistance systems.

In general, the example shows how the disclosed embodiments can generate a map for pedestrian and cycle paths, including typical stop points, by aggregating clusters of data, which map additionally includes the real, actual transport routes of people which are optionally used in a way that deviates from structural transport routes. In other words, the routes measured can therefore deviate from the map data derived from the structural framework. This, and the additionally determined typical stop points, can then be used by an emergency braking system, for example, to avoid failed interventions or to check the plausibility of interventions. Even transport routes with a low density of use, i.e., with currently few visible pedestrians or cyclists, can thereby also be made available. As a result, road safety can be significantly increased.

LIST OF REFERENCE SYMBOLS

10 Road
12 Main road
14 Transportation vehicle
16 Environment sensors
18 Surrounding area
20 Central data-processing unit
22a Route
24 Stop point
F1, F2 Pedestrian
F3, F4 Cyclist
K Map data
P Position data
P1-P5 Position
W Route data

The invention claimed is:

1. A transportation vehicle that is configured to detect people in an area surrounding the transportation vehicle and to specify position data of the detected people, wherein the transportation vehicle transmits the specified position data to a central data-processing unit and receives route data for at least one route from the central data-processing unit, wherein the route data is specified based on aggregated position data of the transportation vehicle and/or of second transportation vehicles, wherein the route data is at least partly used by people as part of map data,
wherein, based on the aggregated position data, a review is performed whether at least one stop point is located on the specified route, and, in response to the at least one stop point being located on the specified route, a position of the stop point is provided to the first transportation vehicle as part of the route data, and
wherein, based on the specified position data, movement data of the people are determined and the at least one stop point is specified based on the movement data.

2. The transportation vehicle of claim 1, wherein the people are pedestrians and/or cyclists.

3. The transportation vehicle of claim 1, wherein the second transportation vehicles detect the people in respective surrounding areas by at least one environment sensor.

4. The transportation vehicle of claim 1, wherein the second transportation vehicles repeatedly detect the position data of the people for as long as the respective people are located in respective detection areas of the respective second transportation vehicles.

5. The transportation vehicle of claim 1, wherein, to detect at least one of the people through at least one of the second transportation vehicles, an object in the surrounding area of the second transportation vehicle is detected, and the detected object is classified as a person or at least as being related to a person.

6. The transportation vehicle of claim 1, wherein a first position of the detected person relative to the second transportation vehicle is specified to provide the position data concerning the at least one of the detected people through at least one of the second transportation vehicles, and a second position of the second transportation vehicle is specified, and the position data are determined based on the first position and the second position.

7. The transportation vehicle of claim 1, wherein at least one driver assistance function of the first transportation vehicle is carried out based on the route data provided.

8. A central data processing unit for providing map data in a first transportation vehicle, wherein the central data processing unit:
receives position data detected by a plurality of second transportation vehicles concerning people detected by the second transportation vehicles in a surrounding area of the respective second transportation vehicles;
aggregates the received position data and specifies at least one route which was at least partly used by at least some of the people based on the aggregated position data; and
provides route data of the specified at least one route as part of the map data in the first transportation vehicle,
wherein, based on the aggregated position data, a review is performed whether at least one stop point is located on the specified route, and, in response to the at least one stop point being located on the specified route, a position of the stop point is provided to the first transportation vehicle as part of the route data.

9. A method for providing map data in a first transportation vehicle, the method comprising:
transmitting position data detected by a plurality of second transportation vehicles concerning people detected by the second transportation vehicles in a surrounding area of the respective second transportation vehicles to a central data-processing unit;
specifying at least one route at least partly used by at least some of the people by the central data-processing unit based on the aggregated position data; and
providing route data of the specified at least one route as part of the map data in the first transportation vehicle,
wherein, based on the aggregated position data, a review is performed whether at least one stop point is located on the specified route, and, in response to the at least one stop point being located on the specified route, a position of the stop point is provided to the first transportation vehicle as part of the route data.

10. The method of claim 9, wherein the people are pedestrians and/or cyclists.

11. The method of claim 9, wherein the second transportation vehicles detect the people in the respective surrounding areas by at least one environment sensor.

12. The method of claim 9, wherein the second transportation vehicles repeatedly detect the position data of the people for as long as the respective people are located in a specific detection area of the respective second transportation vehicles.

13. The method of claim 9, wherein, to detect at least one of the people through at least one of the second transportation vehicles, an object in the surrounding area of the second transportation vehicle is detected, and the detected object is classified as a person or at least as being related to a person.

14. The method of claim 9, wherein a first position of the detected person relative to the second transportation vehicle is specified to provide the position data concerning the at least one of the detected people through at least one of the second transportation vehicles, and a second position of the second transportation vehicle is specified, and the position data are determined based on the first position and the second position.

15. The method of claim 9, wherein at least one driver assistance function of the first transportation vehicle is carried out based on the route data provided.

* * * * *